E. M. WIDDIS.
DEVICE FOR TEACHING MUSIC.
APPLICATION FILED JUNE 8, 1914.
1,133,773. Patented Mar. 30, 1915.
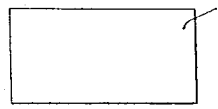

UNITED STATES PATENT OFFICE.

ETHEL M. WIDDIS, OF DETROIT, MICHIGAN.

DEVICE FOR TEACHING MUSIC.

1,133,773.  Specification of Letters Patent.  Patented Mar. 30, 1915.

Application filed June 8, 1914. Serial No. 843,617.

*To all whom it may concern:*

Be it known that I, ETHEL M. WIDDIS, a citizen of the Dominion of Canada, and a resident of Detroit, in the county of Wayne and State of Michigan, have invented a new and Improved Device for Teaching Music, of which the following is a specification.

This invention relates to a device for teaching music, and its object is to provide an instructive game of this character which shall be simple, interesting, instructive and readily adapted to the advance of the student.

This invention consists in a series or set of cards or other supports to be distributed among the students of a class, each card having thereon a plurality of motifs or other musical characters, the characters on any one card being arranged in a predetermined manner, which is preferably different from the arrangement of those on any of the other cards of the set or series, together with a series of covers or other means whereby the characters or motifs may be individually identified by the students.

The invention also consists in a key-card with which the instructor is provided, said key-card having thereon a series of indications corresponding to all of the cards in the hands of the class, and means for identifying the particular card in the hand of any one of the students, whereby the teacher is enabled to tell at a glance the arrangement of characters on a given student's card.

The invention further consists in the details of construction shown and described, and particularly pointed out in the claims.

In the drawings, Figure 1 is a plan view of one of the students' cards. Fig. 2 is a fragmentary plan view of the key-card. Fig. 3 is a plan of one of the covers that may be used to identify the characters or motifs.

It is a well known principle of psychology that the mind is most receptive to exterior influences when the interest is aroused and retained. This principle I have embodied in the present game, the ultimate object of which is to impart instruction in music, and the proximate object of which is to stimulate the interest of the student.

Each of the students is supplied with a card 1, such, for example, as shown in Fig. 1, having indicated thereon a series of motifs do re do, re mi re, so la so, and so on.

The motifs of each card are arranged in some predetermined manner, for instance, in two sets of lines at right angles to each other, as shown, the individual motifs being arranged differently in the different cards. The cards are respectively identified in some manner, preferably by being numbered consecutively in the upper left-hand corner. Each student is also supplied with means for indicating the motifs that he may have identified on his card, preferably a series of covers 2 (Fig. 3), that may be of glass, cardboard or other material. Each of the cards also preferably has written thereon the key (C-major in the card shown) and the staff, together with the appropriate clef-sign. For beginners, the motifs may be written out, as shown at the left-hand side of Fig. 1; but for more advanced classes the lettered designation is preferably omitted.

In order to keep informed of the particular arrangement of motifs or characters before the various students, the teacher is provided with a key-card 3 that may be of the character indicated in Fig. 2. This card comprises a series of rectangular blocks designated 1, 2, 3, 11, 12, 13, etc., the numerical designation of each block corresponding to that of the number of a card in the hands of one of the students. Each block is subdivided in the same manner as is one of the student's cards, and within the subdivisions the motifs found on the various students' cards are preferably written—do re do, re mi re, etc.—although they may be indicated in certain cases by the usual music-notation such as on the students' cards. The position of the note in the scale may be indicated by the presence or absence of a horizontal mark above or below the particular note; and the card may bear an indication of the key, as shown in the upper right-hand corner of Fig. 2. It will be understood that various sets of these cards may be provided corresponding to the different keys in the treble and base clefs, both major and minor, and motifs or characters of the pitch names of the lines and spaces, in treble and bass clefs, both major and minor, and the glossary.

Use: The game played with these cards is susceptible of various modifications. For beginners, the teacher may, for example, call a certain motif, upon which the students search their cards and, upon finding it, identify it by placing over it one of the covers 2. This process may continue until one of the students has filled in one of the lines of motifs with covers, whereupon he calls "Orpheus," or some other appropriate word, and is credited with a point. The teacher may, by a judicious selection of motifs, permit a backward child to win, and thus keep him interested. This modification of the game is particularly adapted for training the eye. The game may also be used for training the ear, in which instance the teacher may establish the key by having the class sing the scale and the tonic chord several times each. She may then hum, sing or play a motif, after which the students cover the motif that they think they have heard. Or the teacher may sing a motif, and then have the pupils repeat it and identify it on the card as before. Still another variation is to allow one of the pupils to call off or sing the motifs.

There are several divisions or grades of the game, corresponding to the advance of the student. For example, the characters upon the cards may be arranged to indicate stepwise progression—do re do, re mi re, mi fa mi, etc.—as in the card shown; or to teach intervals—fourths, fifths, sixths, etc.; or triads; or chromatic progression—sharps and flats; or the rhythmic types, and motifs of the pitch names of lines and spaces, both in treble and bass clef—major and minor and the glossary, as will be readily understood by musicians. When a student has mastered one of these divisions, he is advanced to the next, and by the time he has played the five named divisions in a given key, he should be able to read and sing at sight in that key.

It is obvious that many changes may be made, both in the cards themselves and in the rules under which they are used. For example, while I have shown and prefer to indicate motifs, as distinguished from single syllables or notes, on each subdivision of the cards, it is clear that single notes may be substituted for the motifs. And while I prefer to use paper cards, it is also clear that the characters of music may be written on other supports, such as slates, boards, and the like. I do not, therefore, wish to be limited otherwise than as indicated by the subjoined claims.

I claim:—

1. In a game for teaching music, a plurality of separate supports each having thereon means to indicate a common key, and also having thereon a common clef-sign, together with a plurality of characters of music arranged in a predetermined manner, the manner in which the characters are arranged on some of the supports being different from the manner in which they are arranged on others of the supports, and means to indicate the characters which a student may have identified.

2. In a game for teaching music, a plurality of separate supports each having thereon means to indicate a common key and also having thereon a common clef-sign, together with a plurality of motifs arranged in a plurality of lines, the manner in which the motifs are arranged on some of the supports being different from the manner in which they are arranged on others of the supports, and a plurality of separate covers for indicating the motifs which may be identified by a student.

3. In a game for teaching music, a plurality of supports each having thereon a plurality of characters of music arranged in a predetermined manner, the arrangement of the characters of music on some of the supports being different from the arrangement of characters on others of the supports, and means for indicating the characters which a student may have identified.

4. In a game for teaching music, a plurality of supports each having thereon a plurality of characters of music arranged in a predetermined manner, the arrangement of the characters of music on some of the supports being different from the arrangement of characters on others of the supports, means for indicating the characters which a student may have identified, and a separate support having thereon means for indicating all the characters of music together with the different arrangements thereof on all of the other supports.

5. In a game for teaching music, a plurality of supports each having thereon a plurality of motifs arranged in a plurality of lines, the arrangement of the motifs on some of the supports being different from the arrangement of the motifs on others of the supports, means for indicating the motifs which a student may have identified, each of the supports also having thereon means for indicating a key and means for indicating a clef, and a separate support having thereon means for indicating all of the motifs together with the different arrangements thereof on all of the other supports.

6. In a game for teaching music, a plurality of supports each having thereon a plurality of characters of music arranged in a predetermined manner in a plurality of lines longitudinally and transversely of the corresponding support, the arrangement of the characters of music on some of the supports being different from the arrangement of characters on others of the supports, and means for indicating the characters which a student may have identified.

7. In a game for teaching music, a plurality of supports each having thereon a plurality of characters of music arranged in a predetermined manner in a plurality of lines longitudinally and transversely of the corresponding support, the arrangement of the characters of music on some of the supports being different from the arrangement of characters on others of the supports, means for indicating the characters which a student may have identified, and a separate support having thereon means for indicating all of the characters of music together with the different arrangements thereof on all of the other supports.

In testimony whereof I have signed this specification in the presence of two subscribing witnesses.

ETHEL M. WIDDIS.

Witnesses:
 HUGO W. KREINBRING,
 ALBERT WIDDIS.

Copies of this patent may be obtained for five cents each, by addressing the "Commissioner of Patents, Washington, D. C."